Patented Oct. 25, 1927.

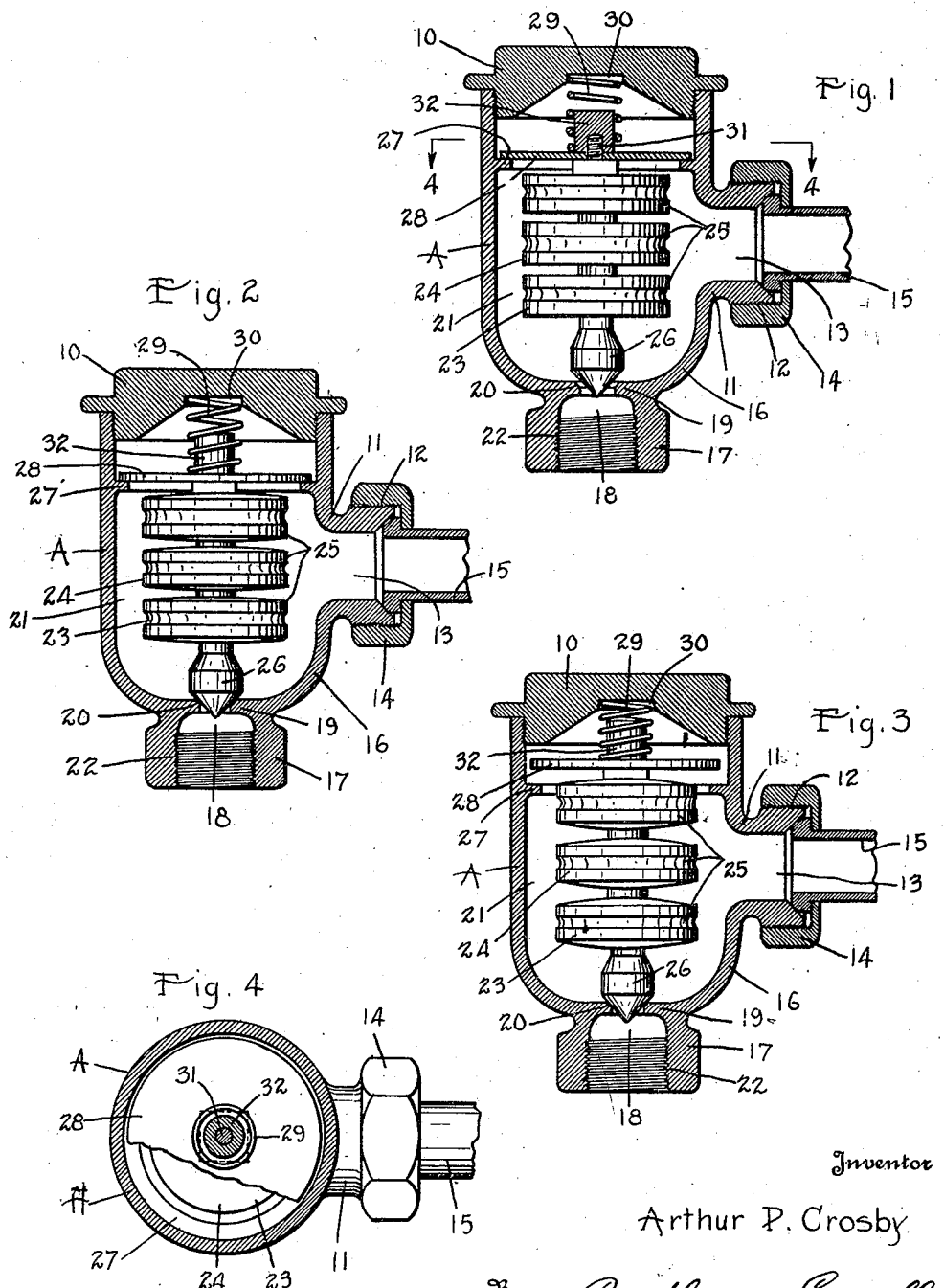

1,646,686

UNITED STATES PATENT OFFICE.

ARTHUR P. CROSBY, OF MINNEAPOLIS, MINNESOTA, ASSIGNOR OF ONE-HALF TO WILLIAM T. PRICE, OF MINNEAPOLIS, MINNESOTA.

RADIATOR RETURN TRAP.

Application filed March 15, 1926. Serial No. 94,987.

My invention relates to the radiator return traps and particularly to the type of trap employing a fluid actuated thermoresponsive expansible element, and has for an object to provide a yieldable abutment for said element permitting the same to expand abnormally without injurious restriction thereagainst in the presence of unusually high temperatures within the trap.

Another object of the invention resides in providing a housing formed with an inlet and an outlet and a valve mechanism for closing said outlet, said housing having a stop for said yieldable abutment, and said element abutting said abutment and serving to actuate said valve mechanism.

With the foregoing and other objects in view, which will appear in the following description, the invention resides in the novel combination and arrangement of parts and in the details of construction hereinafter described and claimed.

In the drawings:

Fig. 1 is a longitudinal sectional view of a trap illustrating an embodiment of my invention.

Fig. 2 is a view similar to Fig. 1 showing the valve mechanism in closed position.

Fig. 3 is a view similar to Fig. 2 illustrating the valve member closed and the yieldable abutment free from the stop.

Fig. 4 is a sectional view taken on line 4—4 of Fig. 1.

In the various steam heating systems employing traps utilizing thermoresponsive elements operating against fixed abutments for the purpose of closing the valve mechanisms within the traps, numerous such elements are injured and rendered useless due to the expansion thereof caused by abnormal increases of temperature within the traps. My invention overcomes this disadvantage and prevents injury to thermoresponsive element by providing a yieldable abutment against which said element abuts, thereby permitting of expansion of said element in excess of that required to close the valve.

The embodiment of my invention illustrated in the drawings comprises a housing A of cylindrical formation open at the top and threaded to receive a cap or closure 10 to form a chamber 21 within the housing. At one side of housing A is formed a neck 11 providing an inlet into the chamber 21 of said housing, which neck is externally threaded at 12 to receive a clamp nut 14 by means of which the entire trap may be rigidly mounted upon the usual nipple 15 of the ordinary radiator on which the trap is to be used. Depending from the lower wall 16 of the housing A is a neck 17 having an outlet 18 communicating with the chamber 21 of the housing A. This neck is constricted at its juncture with the wall 16 of housing A, as indicated at 19, said wall being formed with a valve seat 20 adapted to receive a valve closure, presently to be described, for the purpose of closing the opening from chamber 21 to the outlet 18. The interior of the neck 17 is threaded at 22 to receive a pipe not shown in the drawings by means of which the water entering the trap may be conducted away.

Within the housing A is supported a thermoresponsive fluid actuated expansible element 23. This structure being well known in the art will not be described in detail further than to mention that the same consists of a shell-like structure 24 of resilient material arranged in a number of folds 25 and filled with some fluid sensitive to changes in temperature so that when the temperature surrounding said element increases, the same elongates to produce the results desired. Upon the lower end of this member is attached a valve head 26, which, in the normal relation of element 23, is situated above and clear of the valve seat 20 so that condensation and air entering the chamber 21 through inlet 13 may be conducted away from the trap through the outlet 18. As the temperature within the chamber 21 increases due to the entrance of steam into said trap the expansible element 23 becomes elongated as previously described and causes the valve head 26 to engage the seat 20 and thereby close the outlet 18 and prevent escape of steam through the trap.

The thermoresponsive element 23 is supported at its upper end within the housing A as follows: Within the upper portion of this housing above the neck 11 and the thermoresponsive element 23, I form an annular stop or shoulder 27 which is of such width as to allow the thermoresponsive element 23 or any portion of the same to pass freely therethrough. Upon this stop is positioned a plate or disc 28 which is held in contact therewith by means of a coil spring 29 seated at one end upon said plate and at its other end within a socket 30 formed centrally in inner surface of cap 10. The thermoresponsive element 23 is provided with a stud screw 31 issuing from the upper portion thereof and passing through the center of the plate 28. Threaded upon the end of said stud screw 31 is a nut 32 which serves to hold said thermoresponsive element securely attached to said plate 28. The nut 32 is preferably of cylindrical formation and is of such a size as to fit snugly within the coil spring 29. This spring pressed plate structure not only provides a mounting for the element 23, but serves as an abutment against which said element reacts when the valve head 26 is seated.

The operation of the invention is as follows: The thermoresponsive element 23 is normally held supported through the plate 28, stop 27 and spring 29 as shown in Fig. 1, with the valve head 27 spaced from and above the valve seat 20. So long as condensation or air or both are present in the trap, the valve head 26 remains open due to the relatively low temperature to which the element 23 is subjected. In this position of the valve head 26, such condensation and air escapes through outlet 18. When steam enters the trap and subjects the element 23 to increased temperature, the fluid within thermoresponsive element 23 expands, thereby elongating said element, whereupon the valve head 26 is forced against the seat 20 effecting a closure between the outlet 18 and chamber 21 and preventing the leakage of steam through this outlet. If for any particular reason the temperature of the steam entering the chamber 21 should exceed that for which the trap is normally designed to operate, further expansion of the fluid within the element 23 would occur, which with the ordinary type of trap would cause the thermoresponsive element to burst or become otherwise injured so as to fail to function properly. When such an increase in temperature occurs with my invention, the fluid within the element 23 continues to expand and said element continues to elongate, at the same time raising the disc 28 from the stop 27 against the action of the spring 29, as shown in Fig. 3. This permits of excess expansion without injury to the thermoresponsive element 23, spring 29 being of such resiliency as to freely yield to the movement of said element upon abnormal increase of temperature within the chamber 21 and at the same time hold the valve head 26 properly seated upon the seat 20. When the temperature within the chamber 21 again falls back to normal, plate 28 becomes reseated upon the stop 27 and the trap is again ready to function in the usual manner.

The invention is highly advantageous in that it provides a simple and effective structure for permitting abnormal expansion of the thermoresponsive element therein due to accidental or unusual increase of temperature within the trap, the proper functioning of the thermoresponsive element under ordinary conditions being interfered with in no way.

Changes in the specific form of my invention, as herein disclosed, may be made within the scope of what is claimed without departing from the spirit of my invention.

Having described my invention, what I claim as new and desire to protect by Letters Patent is:

1. A trap comprising a housing having an inlet and an outlet, a valve seat formed in conjunction with said outlet, an annular shoulder formed within said housing, a disk adapted to be seated upon said shoulder, a spring for holding said disk in contact therewith, a thermoresponsive element attached to said disk and a valve member attached to said thermoresponsive element adapted to seat against said valve seat, said disk being of a diameter greater than said thermoresponsive element to hold said valve member in proper relation to said valve seat, said disk being adapted to recede from said shoulder under pressure from said element due to abnormal increases of temperature within said housing.

2. A trap comprising a housing having an inlet and an outlet, a valve seat formed in conjunction with said outlet, an annular shoulder formed within said housing, a thermoresponsive element having a valve member attached thereto adapted to seat against said valve seat, means formed on said thermoresponsive element for engagement with said shoulder, resilient means for holding said means seated upon said shoulder, said shoulder being of a diameter greater than said thermoresponsive element for allowing the free movement thereof relative to said shoulder upon undue expansion of said thermoresponsive element.

3. A trap comprising a housing having an inlet and an outlet, a valve seat formed in conjunction with said outlet, an annular shoulder formed within said housing, a floating unit within said housing comprising a thermoresponsive element, a valve member attached thereto and a member secured to said thermoresponsive element for engagement with said shoulder, said unit passing through said annular shoulder, said shoulder being of a diameter greater than the diameter of the portion of said unit passing therethrough to give unrestricted freedom of movement to said unit, and means for yieldingly holding said member in contact with said shoulder, said member being adapted upon excessive expansion of said thermoresponsive element to recede from said shoulder.

4. A trap comprising a housing having an inlet and an outlet, a valve seat formed in conjunction with said outlet, an annular shoulder formed within said housing, a disk adapted to be seated upon said shoulder, a thermoresponsive element attached to said disk, a valve member mounted on said thermoresponsive element and adapted to seat upon said valve seat, a stud issuing outwardly from said thermoresponsive element, a lug adapted to screw upon said stud for holding said disk attached to said thermoresponsive element, and a compression coil spring attached to and supported by said lug, said spring being adapted to engage said housing for holding said disk in contact with said annular shoulder.

In testimony whereof, I have signed my name to this specification.

ARTHUR P. CROSBY.